(12) United States Patent
Chenu-Tournier et al.

(10) Patent No.: US 7,420,912 B2
(45) Date of Patent: Sep. 2, 2008

(54) METHOD TO INCREASE THE CAPACITY OF A TRANSMISSION SYSTEM USING WAVEFORMS

(75) Inventors: Marc Chenu-Tournier, Paris (FR); Adrien Renoult, Paris (FR)

(73) Assignee: Thales (FR)

( * ) Notice: Subject to any disclaimer, the term of this patent is extended or adjusted under 35 U.S.C. 154(b) by 700 days.

(21) Appl. No.: 10/807,458

(22) Filed: Mar. 24, 2004

(65) Prior Publication Data

US 2004/0246887 A1 Dec. 9, 2004

(30) Foreign Application Priority Data

Mar. 25, 2003 (FR) .................................. 03 03644

(51) Int. Cl.
*H04J 11/00* (2006.01)
*H04Q 1/10* (2006.01)

(52) U.S. Cl. ...................... 370/203; 370/208; 375/346

(58) Field of Classification Search ...................... None
See application file for complete search history.

(56) References Cited

U.S. PATENT DOCUMENTS

| | | | |
|---|---|---|---|
| 6,307,851 B1 | 10/2001 | Baier et al. | |
| 7,151,833 B2 * | 12/2006 | Candelore et al. | ........... 380/217 |
| 7,224,744 B2 * | 5/2007 | Giannakis et al. | ........... 375/267 |
| 7,245,677 B1 * | 7/2007 | Pare, Jr. | ...................... 375/344 |
| 2002/0176519 A1 * | 11/2002 | Chiodini et al. | ............. 375/324 |
| 2003/0072395 A1 * | 4/2003 | Jia et al. | ...................... 375/341 |
| 2004/0081076 A1 * | 4/2004 | Goldstein et al. | ........... 370/208 |
| 2004/0208238 A1 * | 10/2004 | Thomas et al. | ............... 375/148 |
| 2004/0253986 A1 * | 12/2004 | Hochwald et al. | ......... 455/562.1 |
| 2005/0265281 A1 * | 12/2005 | Ketchum | ..................... 370/328 |
| 2006/0013327 A1 * | 1/2006 | Sugar et al. | .................. 375/260 |
| 2006/0291581 A1 * | 12/2006 | Onggosanusi et al. | ....... 375/267 |

FOREIGN PATENT DOCUMENTS

FR 2828615 A 2/2003

OTHER PUBLICATIONS

"The Performance of Multi-Carrier with Base Station Antenna Arrays in Fading Channels", Tian Q et al, Tokyo Japan 2000-Spring. vol. 2 of 3 conf. 51, May 15-18, 2000, pp. 1498-1502.
"Intercarrier Interference in MIMO OFDM" Suhas Diggawi et al, vol. 1 of 5, Apr. 28, 2002; May 2, 2002, pp. 485-489.

* cited by examiner

*Primary Examiner*—Andrew Lee
(74) *Attorney, Agent, or Firm*—Lowe Hauptman Ham & Berner, LLP

(57) ABSTRACT

A method to increase capacity in a transmission system using parallel waveforms comprises several transmitters and at least one receiver. To determine the signal received at the receivers, the method takes account of all the parameters observed on all the sub-carriers of the majority of the receivers or their totality.

6 Claims, 3 Drawing Sheets

METHOD TO INCREASE THE CAPACITY OF A TRANSMISSION SYSTEM USING WAVEFORMS

BACKGROUND OF THE INVENTION

1. Field of the Invention

The invention relates notably to a method for increasing the capacity of a transmission system using parallel waveforms.

It can be applied to any system whose modulation is an OFDM type of modulation or an OFDM (MC-CDMA or other) type modulation.

2. Description of the Prior Art

The 802.11, 802.16 and HyperLAN/2 wireless networks use OFDM (Orthogonal Frequency Division Multiplexing) waveforms. FIG. 1 shows sub-carriers of a classic OFDM modem. These types of modulation entail the simultaneous sending of several symbols on orthogonal sub-carriers and they form part of parallel modems.

The utility of these OFDM modems is that demodulation can be done in a simple manner. In general, at transmission, a cyclical prefix (FIG. 2) is introduced in order to preserve the orthogonality of the sub-carriers at reception. At reception, this cyclical prefix is removed from the signal, and then a Fourier transform is carried out on the OFDM symbols. Should the length of the channel be smaller than the length of a cyclical prefix, the symbols may be demodulated without any inter-symbol interference, or interference between the sub-carriers after the channel has been estimated. Other forms of parallel modems exist, for example modems using filtered OFDM waveforms and MC-CDMA waveforms.

Classically, a multiple transmission context entails the use of receivers which, in a first step, process the spatial domain, a spatial filtering operation being performed in order to separate the users. Then, in a second step, a classic single-transmitter processing operation is performed. These techniques are known in the case of CDMA (Code Division Multiple Access) transmission.

FIG. 3 shows a structure used to increase the number of transmitters Ei sending simultaneously and thus to increase the capacity of the transmission system. In order to accurately demodulate the symbols transmitted, it is generally necessary to use at least as many reception antennas Ar as transmission antennas.

Should the transmitters share the same transmission systems, for example the local oscillators, the symbols sent are estimated, for example, by separately processing the different sub-carriers because the orthogonality between the sub-carriers is kept. FIG. 4 shows the preservation of orthogonality in a multiple-sending context for a sub-carrier.

In this case, it is possible to estimate the symbols transmitted by using joint demodulation techniques. On each sub-carrier n, the signal observed in the case of linear modulations is expressed by the following relationship:

$$y_n = H_n a_n + b_n \quad (1)$$

where $H_n$ is the matrix $N_c \times N_u$ containing the coefficients of the propagation channel for the sub-carrier n, where $N_c$ is the number of sensors and $N_u$ is the number of users making simultaneous transmission. The $N_u \times 1$ vector $a_n$ contains the $N_u$ symbols of the sub-carrier n of the different users. Finally the $N_c \times 1$ vector $b_n$ contains the samples of the noise for the different reception centers for the sub-carrier n.

Using the model of the signal received from the equation (1), several detectors can be used to estimate the symbols sent. For example, the method uses techniques of joint frequency detection such as the MLSE (Maximum Likelihood Sequence Detection) technique, the MMSE (Minimum Mean Square Error) technique and the DFE (Decision Feedback Equalization) family of techniques. These receivers are classically used for CDMA (Code Division Multiple Access) transmission.

While these techniques perform well, they are not suited to more complex systems, for example, when the transmitters do not share the same oscillator. A frequency offset between the transmitters may then appear and compromise the orthogonality between the sub-carriers.

SUMMARY OF THE INVENTION

The invention relates to a method to increase the capacity in a transmission system using parallel waveforms, comprising several transmitters and at least one receiver, where the transmitters do not share the same frequency and where a frequency offset may appear between them. It is characterized in that it comprises at least the following steps:

a step for modeling the signal y as follows $$\circ y = \begin{bmatrix} H_1^1 & \cdots & H_{N_{sp}}^1 \\ \vdots & \ddots & \vdots \\ H_1^{n_{sp}} & \cdots & H_{N_{sp}}^{N_{sp}} \end{bmatrix} a + b \quad (2)$$

where $H_i^j$ (j¹ i) is the channel matrix representing the interference received on the sub-carrier j of the symbols borne by the sub-carrier i, and a step for the detection of the different symbols sent by different transmitters that have frequency offsets.

The method may include a step for estimating the frequency offsets of the different transmitters relative to the reference of the receiver and a step for computing the inter-sub-carrier and inter-user interference matrix.

The invention also relates to a device to increase the capacity of a transmission system using parallel waveforms, the device comprising several transmitters and at least one receiver, where the transmitters do not share the same frequency and where a frequency offset can appear between them. It is characterized in that the receiver is adapted to:

determining the signal y expressed in the form $$y = \begin{bmatrix} H_1^1 & \cdots & H_{N_{sp}}^1 \\ \vdots & \ddots & \vdots \\ H_1^{N_{sp}} & \cdots & H_{N_{sp}}^{N_{sp}} \end{bmatrix} a + b \quad (2)$$

where $H_i^j$ (j¹ i) is the channel matrix representing the interference received on the sub-carrier j of the symbols borne by the sub-carrier i, and detecting the different symbols sent by different transmitters that have frequency offsets.

The invention has notably the following advantages:

the symbols transmitted are estimated jointly on a part of the sub-carriers or on their totality, the method takes account of the losses of orthogonality of the sub-carriers which may be due to the frequency offsets between the transmitters and/or non-linearities of amplification, the possibility of increasing the number of transmitters in a system using parallel-connected modems to increase the capacity of these systems, it enables the use of non-circular modulation for an OFDM system with frequency offset for the transmitters, in order to improve the rejection and/or the detection of the symbols sent by the different users, it provides the possibility of performing multiple-user detection on the multiple-carrier system when there is a frequency offset between the different transmitters. In this case, the method proposes to estimate the symbols on the sub-carriers in using MMSE linear techniques or DFE-MMSE non-linear techniques in starting from the edges of the spectrum and using drivers as mini-probes. Indeed, the DFE technique implies that the already detected symbols have been accurately detected. The use of extreme frequencies and drivers to reset the detector limits the problems of error propagation intrinsic to the DFE techniques.

In normal operation, no spread code is used and the users are not separated except through the propagation channels.

BRIEF DESCRIPTION OF THE DRAWINGS

Other features and advantages of the invention shall appear more clearly from the following description which is given by way of an illustration that in no way restricts the scope of the invention along with the appended figures, of which.

MORE DETAILED DESCRIPTION

Figure 1:
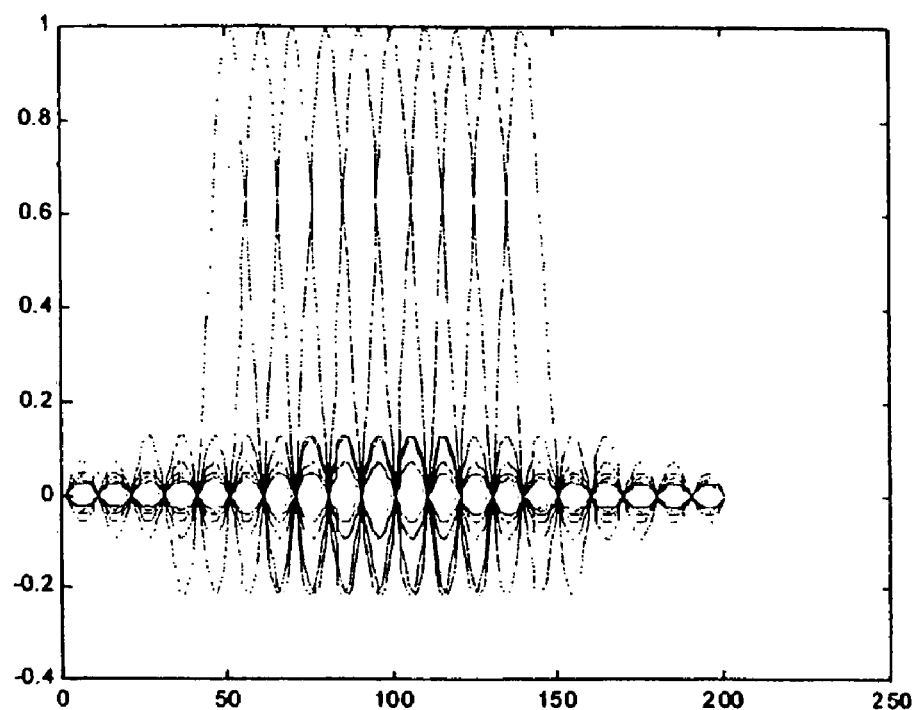
FIG. 1 shows sub-carriers of a classic OFDM modem.
Figure 2:
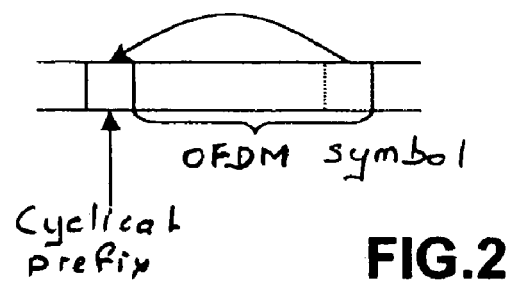
FIG. 2 exemplifies a cyclical prefix introduced before the symbols.
Figure 3:
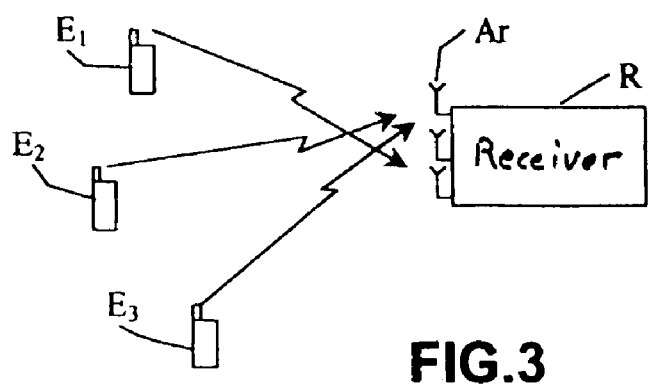
FIG. 3 exemplifies a multi-transmitter scenario.
Figure 4:
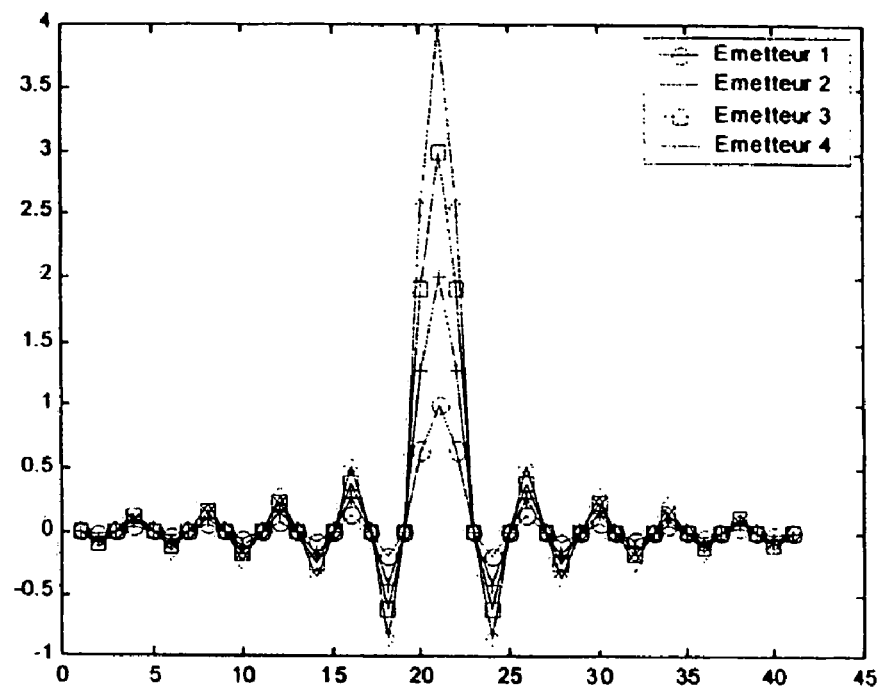
FIG. 4 shows an example, for a sub-carrier, of the conservation of orthogonality in a multi-transmission context.

The idea used in the method according to the invention consists notably in taking account of all the parameters observed on all the sub-carriers of all the receivers to define a matrix of the propagation channel.

For a clearer understanding of the object of the invention, the following example, given by way of an illustration that in no way restricts the scope of the invention relates to a transmission system comprising several transmitters that do not share the same local clock and a receiver adapted to the execution of the different steps of the method. The signals exchanged are OFDM-modulated signals, and the sources or transmitters can be de-synchronized in frequency.

In this context, in addition to the interference between the different users, it is necessary to overcome interference between the sub-carriers. The model of the signal received at the receiver takes the following form $$y = \begin{bmatrix} H_1^1 & \cdots & H_{N_{sp}}^1 \\ \vdots & \ddots & \vdots \\ H_1^{N_{sp}} & \cdots & H_{N_{sp}}^{N_{sp}} \end{bmatrix} a + b \quad (2)$$

where $H_i^j$ ($j^1$ i) is the channel matrix representing the interference received on the sub-carrier j of the symbols borne by the sub-carrier i. The $N_u N_{sp} \times 1$ vecteur a brings together all the symbols transmitted by the different vectors on all the sub-carriers. b is a vector representing noise.

For the detection, the operation can be limited to a subset of the sub-carriers and the above-mentioned techniques can be applied to the detection of the symbols transmitted.

The channel matrix may be estimated in various ways depending on the information known on the signal transmitted. If, for example, the different transmitters simultaneously transmit known sequences (preferably different sequences), the receiver can get synchronized and estimate the channel at the same time by using a method similar to the one described in the patent application FR 2 820 580.

The symbol estimation techniques can then be implemented to detect the symbols transmitted. To this end, the differences in frequency for the different transmitters relative to the reference of the receiver are estimated and the inter-sub-carrier and the inter-user interference matrix is computed.

One simplification of the demodulation technique entails for example the estimation of the symbols transmitted through a DFE (Decision Feed-Back Equalizer), or the use of interference cancellation techniques in beginning the estimation from the edge of the spectrum and/or of driver sub-carriers. Thus, when the estimation is started from the known symbols, the propagation of the errors by DFE is limited. Similarly, in starting the estimation from the edge of the spectrum, corresponding to the extreme sub-carriers, the symbols beyond these edges may be considered to be null symbols and hence, by this very fact, to be symbols that limit the propagation of errors.

In this type of configuration, where a frequency offset exists between the different transmitters, the use of non-circular types of modulation such as CPM (continuous phase modulation), BPSK (biphase shift keying), etc. enables the exploitation of the second moment on the symbols. The model of the signal remains the same but it is thus possible to exploit this second moment which represents the correlation between symbols and the symbols. (The first moment corresponds to the correlation between the symbols and the content symbols). Thus, the separation of the different transmitters having frequency offsets is easier because of the multiple-user cyclical filtering.

According to one alternative implementation of the method according to the invention, providing notably for efficient estimation of the symbols transmitted, it is possible to estimate the propagation channels by implementing the steps described in the patent application FR 2 820 580. The steps are adapted to the joint estimation of the instant of synchronization, the pulse response of the propagation channel for each transmitter and each reception sensor, and the frequency offset. The instant of synchronization is estimated by minimizing the power of the noise, and the channel is then estimated according to the least error square method and the frequencies are estimated parametrically.

The different alternative modes of implementation of the invention are executed, for example, by a processor placed at the position of the receiver.

Figure 5:
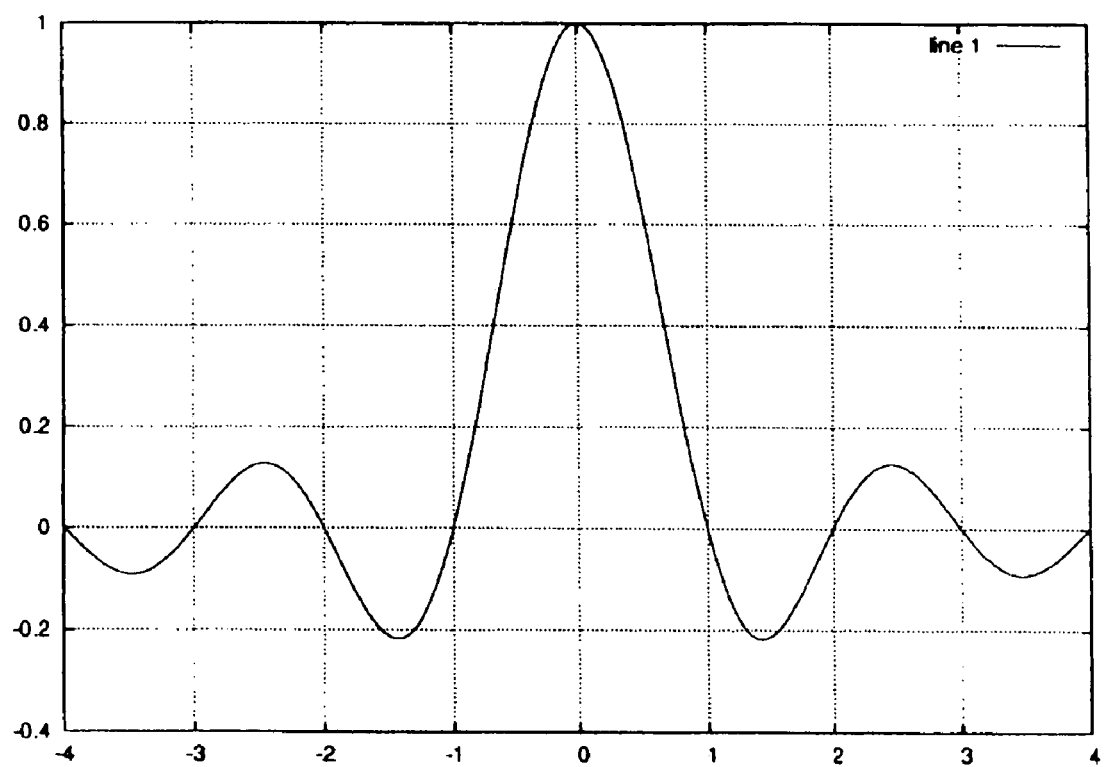
FIG. 5 shows a frequency response of the DFT for a sine waveform, and FIG. 6 exemplifies improvements in performance provided by the invention.

FIG. 5 shows the frequency response of the DFT (discrete Fourier transform) for a sine wave. The x-axis shows the frequency offset and the y-axis shows the modulus of the response. An offset by 1 represents an offset by one sub-carrier. It will be seen that when there is a frequency offset, not only is there a loss of amplitude in the sub-carrier of interest but also interferences are created on the other sub-carriers.

Figure 6:
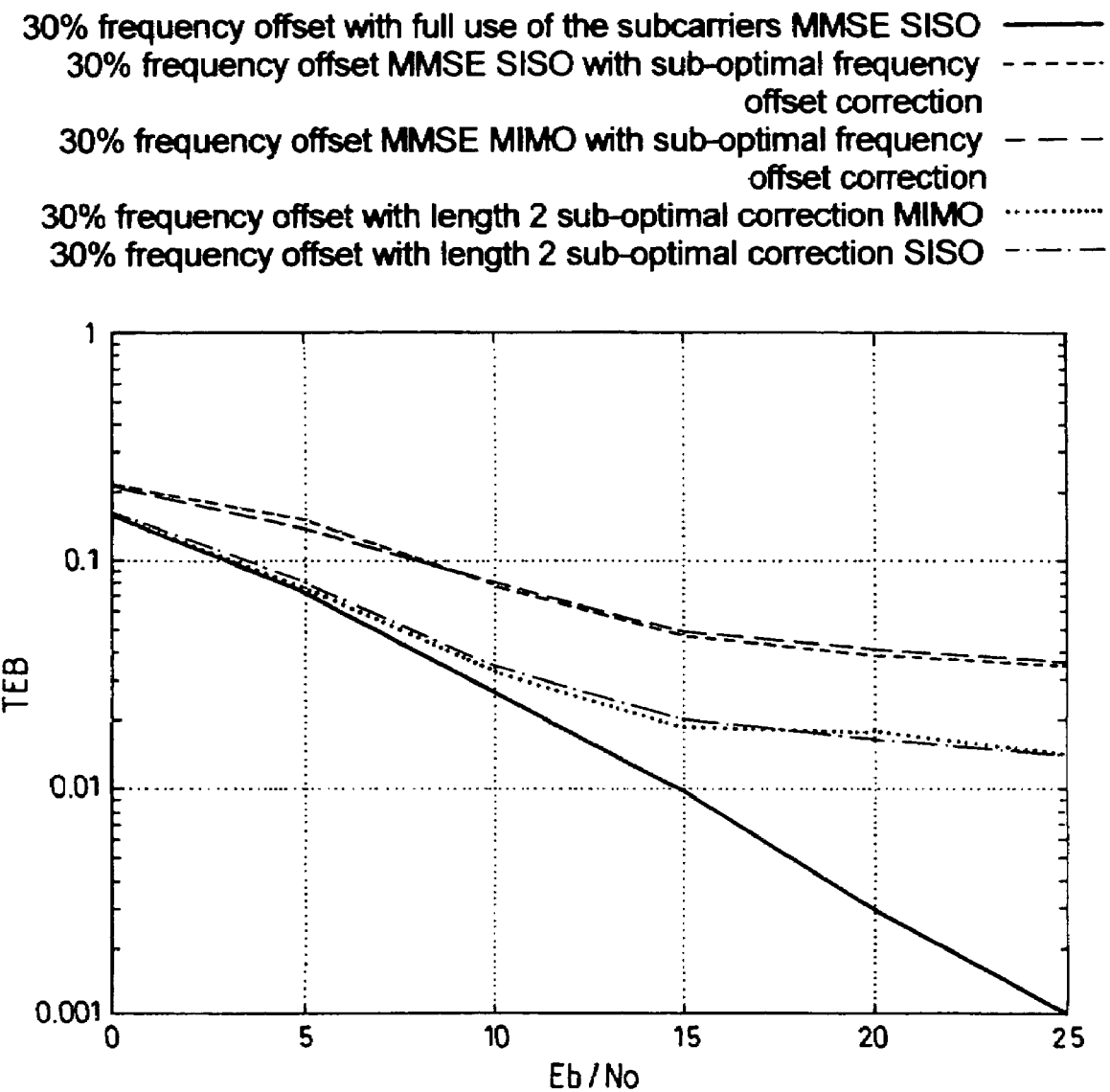

The improvement of performance by the implementation of the method according to the invention is shown in FIG. 6. In this FIG. 6, the performance of the system is proposed in the case of compensation on a single sub-carrier, and on five sub-carriers (the carrier of interest and two sub-carriers on either side of the carrier of interest). In both cases, the performance values are those obtained with an MMSE receiver.

What is claimed is:

1. A method of increasing capacity in a transmission system using parallel waveforms, comprising several transmitters and at least one receiver, where the transmitters do not share the same frequency and where a frequency offset appears between them, wherein the method comprises at least the following steps:

modeling the signal y as follows $$y = \begin{bmatrix} H_1^1 & \cdots & H_{N_{sp}}^1 \\ \vdots & \ddots & \vdots \\ H_1^{N_{sp}} & \cdots & H_{N_{sp}}^{N_{sp}} \end{bmatrix} a + b \quad (2)$$

where $H_i^j$ ($j^1$ i) is the channel matrix representing the interference received on the sub-carrier j of the symbols borne by the sub-carrier i, and detecting the different symbols sent by different transmitters that have frequency offsets.

2. The method according to claim 1, comprising estimating the frequency differences of the different transmitters relative to the reference of the receiver and computing the inter-sub-carrier and inter-user matrix.

3. The method according to claim 1, wherein the waveforms are non-circular modulations such as CPM or BPSK modulations.

4. A device to increase capacity of a transmission system using parallel waveforms, the device comprising several transmitters and a receiver, where the transmitters do not share the same frequency and where a frequency offset appear between them, wherein the receiver to:

determine the signal y expressed in the form $$y = \begin{bmatrix} H_1^1 & \cdots & H_{N_{sp}}^1 \\ \vdots & \ddots & \vdots \\ H_1^{N_{sp}} & \cdots & H_{N_{sp}}^{N_{sp}} \end{bmatrix} a + b \quad (2)$$

where $H_i^j$ ($j^1$ i) is the channel matrix representing the interference received on the sub-carrier j of the symbols borne by the sub-carrier i, and detect the different symbols sent by different transmitters that have frequency offsets.

5. The device according to claim 4, wherein the waveforms are one of non-circular CPM and BPSK modulations.

6. The method of claim 2, wherein the waveforms are non-circular modulations such as CPM or BPSK modulations.

* * * * *